United States Patent [19]
Yun

[11] Patent Number: 5,857,124
[45] Date of Patent: Jan. 5, 1999

[54] DEVICE AND METHOD FOR SETTING A STATE OF FILM USED IN AN ADVANCED PHOTO SYSTEM CAMERA

[75] Inventor: Tae-Kyung Yun, Kyeongsangnam-do, Rep. of Korea

[73] Assignee: Samsung Aerospace Industries, Ltd., Kyeongsangnam-do, Rep. of Korea

[21] Appl. No.: 884,089

[22] Filed: Jun. 27, 1997

[30] Foreign Application Priority Data

Jun. 28, 1996 [KR] Rep. of Korea ...................... 96-24926

[51] Int. Cl.⁶ ................................................. G03B 19/02
[52] U.S. Cl. .......................................... 396/390; 396/538
[58] Field of Search ................................. 396/535, 536, 396/538, 207, 390

[56] References Cited

U.S. PATENT DOCUMENTS

| | | | |
|---|---|---|---|
| 4,728,977 | 3/1988 | Yomogizawa et al. | 396/535 |
| 4,857,946 | 8/1989 | Tominaga et al. | 396/535 |
| 5,608,479 | 3/1997 | Park | 396/390 |
| 5,666,583 | 9/1997 | Murashima et al. | 396/535 |
| 5,675,834 | 10/1997 | Nishio | 396/535 |
| 5,708,899 | 1/1998 | O'Leary et al. | 396/536 |

*Primary Examiner*—Russell Adams
*Attorney, Agent, or Firm*—Finnegan, Henderson, Farabow, Garrett & Dunner, L.L.P.

[57] ABSTRACT

A device for setting a film state for use in a camera having a chamber for storing a film cartridge and a chamber door, and the film cartridge further including a data disk having photographic information recorded thereon. The device includes a photographic information reader which reads the photographic information on the data disk. A door detector detects whether the chamber door is open. A controller determines whether the film is unexposed based upon the photographic information, determines whether the chamber door opens within a predetermined period of time after the chamber door was closed, and outputs a control signal which sets the data disk to an unexposed state if the film is unexposed and the chamber door opens within the predetermined period of time. A transport unit moves the film and sets the data disk based upon the control signal.

11 Claims, 4 Drawing Sheets

DEVICE AND METHOD FOR SETTING A STATE OF FILM USED IN AN ADVANCED PHOTO SYSTEM CAMERA

BACKGROUND OF THE INVENTION

A. Field of the Invention

The present invention relates to an Advanced Photo System (APS) camera, and, more particularly, to an APS camera having a device for setting a state of the film.

B. Description of the Related Art

Film in an APS camera may be in one of the following states: an unexposed state, a partially exposed state, an exposed state, or a processed state. The film state is typically determined by measuring the rotation angle of a data disk, which is mounted to an upper portion of a film cartridge. Thus, after a user loads the film in the APS camera, a control device measures the rotation angle of the data disk. If the film is unexposed, it is wound to a predetermined initial position. If the film is partially exposed, it is wound to a position next to the exposed portion. If the film is exposed, the control device drives a display to indicate that the film is exposed.

When a user loads unexposed film in the APS camera, the film is wound to the predetermined initial position, also referred to as the loading position of the film. If, at this time, the user mistakenly opens the chamber door of the film cartridge or there is a malfunction in the chamber door switch, the film will be rewound as if it were exposed. The rotation angle of the data disk will then indicate that the film is exposed, and the camera will not reload the film even though it is actually unexposed. Thus, a conventional APS camera has the drawback in that an unexposed film is set to an exposed film state when either the user mistakenly opens the chamber door of the film cartridge or there is a malfunction in the chamber door switch.

SUMMARY OF THE INVENTION

Systems consistent with the present invention allow film to be reused by preventing an unexposed film from being regarded as an exposed film when a user opens a chamber door within a predetermined period of time after the unexposed film is loaded.

To achieve these and other advantages, a device for setting a film state, consistent with the present invention, is used within a camera having a chamber for storing a film cartridge and a chamber door, the film cartridge further including a data disk having photographic information recorded thereon. The device includes a photographic information reader that reads the photographic information on the data disk. A door detector detects whether the chamber door is open. A controller determines whether the film is unexposed based upon the photographic information, determines whether the chamber door opens within a predetermined period of time after the chamber door was closed, and outputs a control signal which sets the data disk to an unexposed state if the film is unexposed and the chamber door opens within the predetermined period of time. A transport means moves the film and sets the data disk based upon the control signal.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

The present invention will be described in detail with reference to the accompanying drawings.

Figure 1:
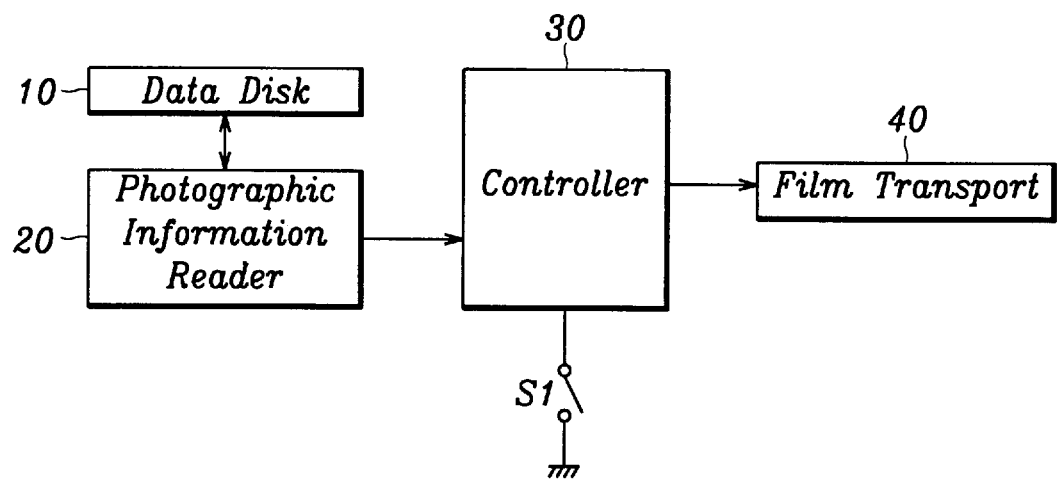
FIG. 1 is a block diagram of a device for setting the film state of an APS camera consistent with the present invention.

As shown in FIG. 1, a device for setting the state of film used in an APS camera comprises: a chamber switch S1, a photographic information reader 20, a controller 30, and a film transport 40. Photographic information reader 20 reads the photographic information stored on data disk 10, which is part of a film cartridge, and outputs information representing the state of the film. Controller 30 receives the output from switch S1 and the output from photographic information reader 20, and generates a control signal. Film transport 40 receives the control signal and, in response, advances the film to a predetermined position.

Figure 3:
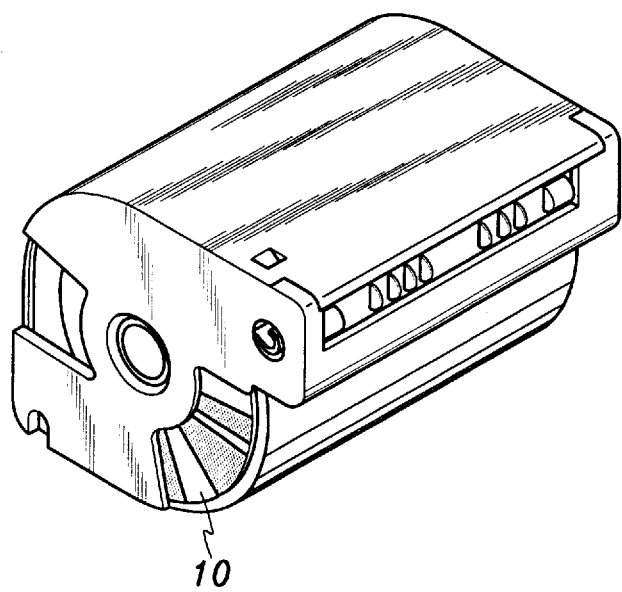
FIG. 3 shows a data disk of a film cartridge for an APS camera.

Data disk 10 is mounted to an upper portion of the film cartridge. As shown in FIG. 3, systems consistent with the present invention use a radial bar code to record the photographic information on data disk 10. The photographic information indicates, for example, the state of the film (i.e., unexposed, partially exposed, unexposed, processed), the ISO sensitivity, and the type of film.

Figure 4:
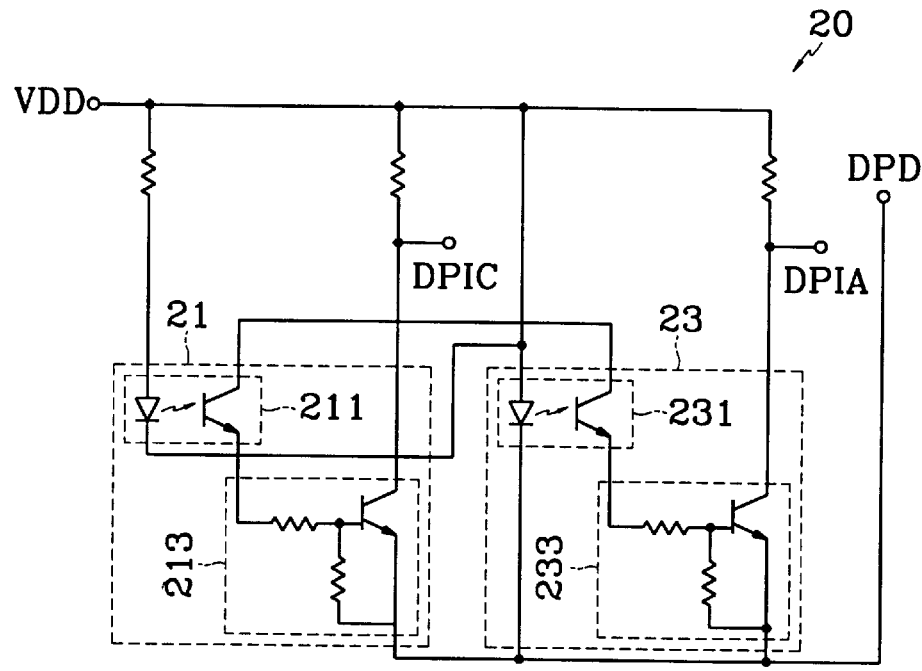
FIG. 4 is a circuit diagram of a photographic information reader of an APS camera consistent with the present invention.
Figure 6:
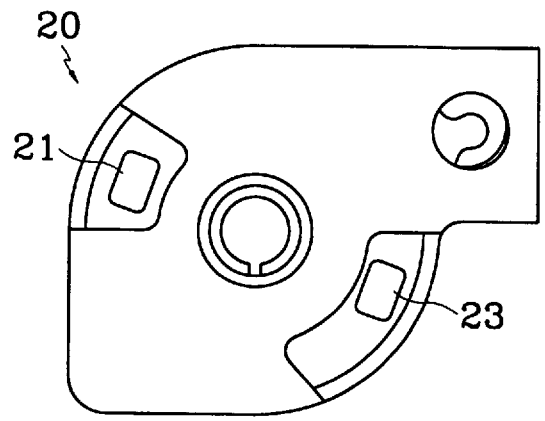
FIG. 6 is a side view of the photographic information reader consistent with the present invention.

As illustrated in FIG. 6, photographic information reader 20 is mounted inside the APS camera in the chamber where the film cartridge is mounted. FIG. 4 is a circuit diagram of photographic information reader 20 consistent with the present invention. As shown in FIG. 4, photographic information reader 20 comprises a first detector 21 and a second detector 23. Detectors 21 and 23 further comprise respective photocouplers 211 and 231, and respective signal generating sections 213 and 233. Each photocoupler 211 and 231 further includes a light emitting diode for emitting light incident on data disk 10 and a phototransistor for receiving the light reflected from data disk 10. Photographic information reader 20 is connected to a power supply through a terminal VDD. The respective signal generating section 213 and 233 receives a control signal through terminal DPD and, generates output signals through respective terminals DPIC and DPIA.

Figure 7:
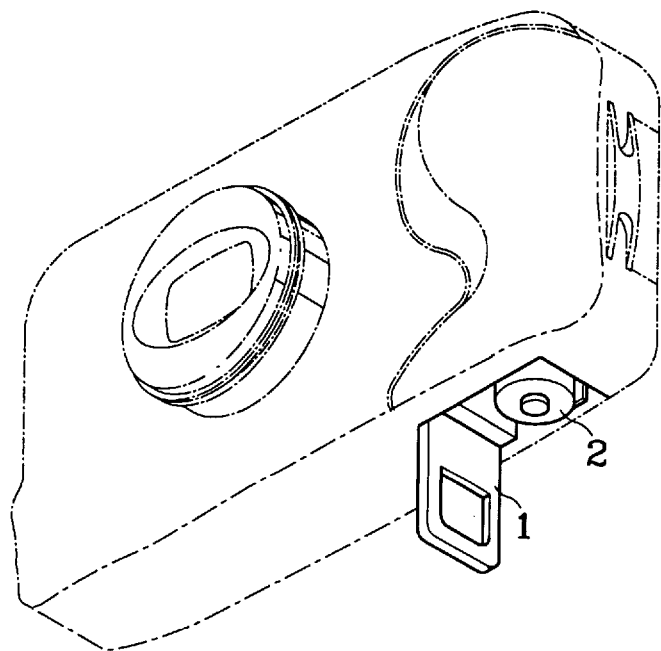
FIG. 7 is diagram of an APS camera loaded with film.

As shown in FIG. 7, the bottom of the APS camera includes a chamber door 1 of a chamber for storing a film cartridge 2. Chamber switch S1 opens or closes depending on whether chamber door 1 is open or closed, respectively.

Figure 2:
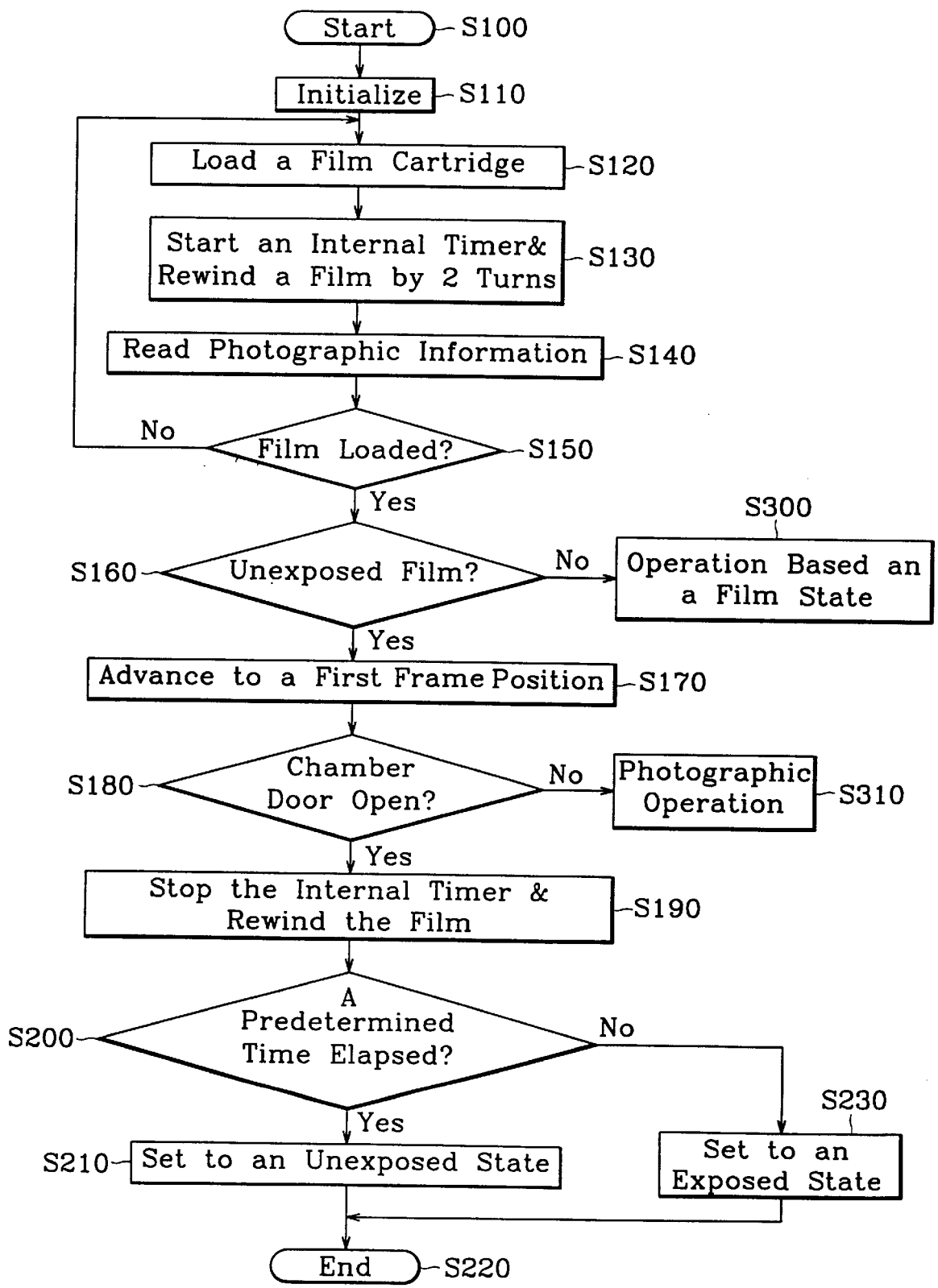
FIG. 2 is a flow chart of a method for setting the film state of an APS camera consistent with the present invention.

FIG. 2 is a flow chart of a method for setting the film state of an APS camera consistent with the present invention. When an APS camera is started on, it is initialized (steps 100 and 110). When a user loads film cartridge 2 into the chamber and closes chamber door 1 (step 120), chamber switch S1 closes and outputs a signal to controller 30. Controller 30 then starts an internal timer (not shown) and drives film transport 40 to rewind the film by two turns, independent of film loading, so that photographic information reader 20 can read the photographic information on data disk 10 during rewinding (steps 130 and 140).

If the photographic information is detected, controller 30 determines that film is loaded. If, on the other hand, the photographic information is not detected, controller 30 determines that film is not loaded (step 150).

Figure 5:
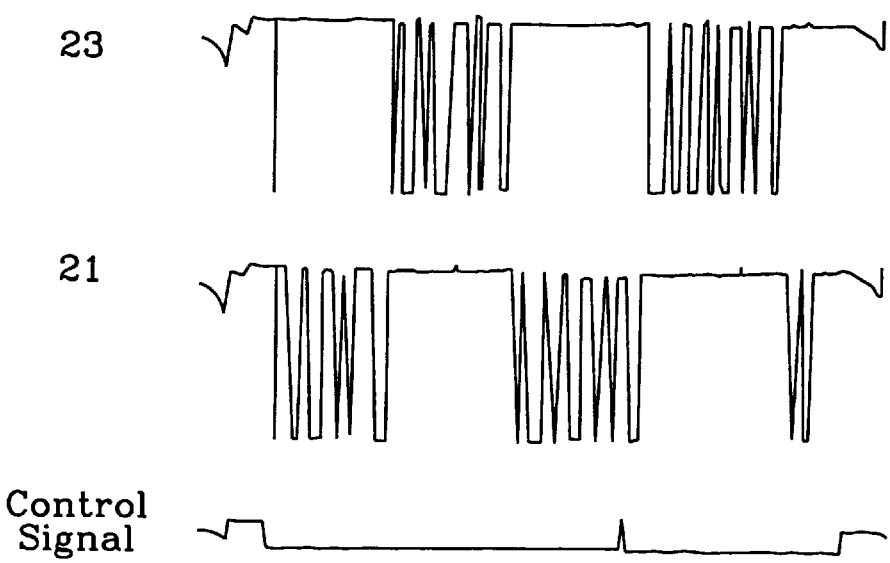
FIG. 5 is a signal waveform of the photographic information reader shown in FIG. 4.

The operation of photographic information reader 20 will now be explained. First and second detectors 21 and 23 of information photographic reader 20 emit light to data disk 10. The emitted light incident on the data disk 10 is either absorbed or reflected by the radial bar code. For instance, when data disk 10 reflects light incident on a space of the radial bar code, photocouplers 211 and 231 turn on respective signal generating portions 213 and 233. Accordingly, detectors 21 and 23 output high level signals corresponding to the reflected light to controller 30. Alternatively, when light is incident on a bar of the radial bar code, the light is absorbed by the bar and no light is reflected to photocouplers 211 and 213. Signal generating portions 213 and 233 will thus turn off and output low level signals to controller 30. In this way, a light signal corresponding to the radial bar code is generated by first and second detectors 21 and 23. FIG. 5 shows the waveforms of the signals generated by first and second detectors 21 and 22. From these signals, controller 30 determines the state of the film as well as the existence of the film.

Returning to FIG. 2, if the film is determined unexposed (i.e., it is new film) based on the photographic information (step 150), then controller 30 drives film transport 40 to advance the film to the first frame position (step 170). If, on the other hand, the film is exposed, partially exposed or processed, the operation based on the film state is performed (step 300).

If, while the film is in the first frame position, chamber switch S1 opens indicating that chamber door 1 is open (step 180), controller 30 stops the internal timer and drives film transport 40 to rewind the film (steps 180 and 190). If chamber door 1 does not open, then the camera is ready for a photographic operation (step 310).

Controller 30 then compares the elapsed time between closing and opening of chamber switch S1 with a predetermined period of time (step 200). When chamber switch S1 opens within the predetermined period of time, controller 30 sets data disk 10 to an unexposed film state (step 210). If, on the other hand, chamber switch S1 opens after the predetermined time, controller 30 determines the film as an exposed film and then sets data disk 10 to an exposed film state. The predetermined time is preferably set to six seconds, taking into consideration film exposure due to external light.

Accordingly, systems consistent with the invention can reuse a film and prevent an unexposed film from being regarded as an exposed film when a user opens the chamber door within a predetermined period of time after the unexposed film is loaded. It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A device for setting a film state for use in a camera, wherein the camera includes a chamber for storing a film cartridge and a chamber door, the film cartridge further including a data disk having photographic information recorded thereon, the device comprising:

a photographic information reader which reads the photographic information recorded on the data disk;

a door detector which detects whether the chamber door is open or closed;

a controller for determining whether the film is unexposed based upon the photographic information, determining whether the chamber door opens within a predetermined period of time after the chamber door was closed, and outputting a control signal which sets the data disk to an unexposed state if the film is unexposed and the chamber door opens within the predetermined period of time; and transport means for moving the film and setting the data disk based upon the control signal.

2. The device of claim 1, wherein:

when the film is loaded and the door detector detects that the chamber door is closed, the transport means rewinds the film and the photographic information reader reads the photographic information while the film is being rewound.

3. The device of claim 1, wherein:

when the controller determines that the film is unexposed, the controller outputs a signal to the transport means to advance the film to a predetermined frame position; and when the controller determines that the chamber door opens within the predetermined period of time after the chamber door was closed, the controller outputs a signal to the transport means to rewind the film and to set the data disk to an unexposed state.

4. The device of claim 3, wherein:

the controller measures the time between closing and opening of the chamber door, and compares the measured time with the predetermined period of time.

5. The device of claim 3, wherein:

the predetermined period of time is six seconds.

6. The device of claim 1, wherein:

the photographic information reader includes a plurality of detectors, each detector comprising:

a photocoupler having a light emitting diode for emitting light incident on the data disk and a phototransistor for receiving light reflected from the data disk; and a signal generating means, connected to the photocoupler, for generating a signal corresponding to the light reflected from the data disk.

7. A method for setting a film state of film used in a camera, wherein the camera includes a chamber for storing a film cartridge and a chamber door, the film cartridge further including a data disk having photographic information recorded thereon, the method comprising the steps of:

(a) closing the chamber door after the film is loaded;

(b) reading the photographic information recorded on the data disk;

(c) determining whether the chamber door opens when the photographic information indicates that the film is unexposed;

(d) determining whether the chamber door opens within a predetermined period of time after the chamber door was closed; and (e) setting the data disk to an unexposed state when the chamber door opens with the predetermined period of time.

8. The method of claim 7, further comprising the step of:
rewinding the film when the film is loaded and the chamber door is closed, and wherein the rewinding step is performed concurrently with the reading step.

9. The method of claim 7, further comprising the step of:
advancing the film, prior to the operation of determining step (c), to a predetermined frame position when the photographic information indicates that the film is unexposed.

10. The method of claim 7, wherein determining step (c) comprises the substeps of:
measuring the time between closing and opening of the chamber door; and
comparing the measured time with the predetermined period of time.

11. The method of claim 7, wherein the predetermined period of time is six seconds.

* * * * *